(12) United States Patent
Bao et al.

(10) Patent No.: US 9,028,573 B2
(45) Date of Patent: May 12, 2015

(54) EDM CUTTABLE, HIGH CBN CONTENT SOLID PCBN COMPACT

(75) Inventors: Yahua Bao, Orem, UT (US); Scott Horman, Orem, UT (US); Xian Yao, Sandy, UT (US); Qingyuan Liu, Orem, UT (US)

(73) Assignee: Element Six Limited (IE)

( * ) Notice: Subject to any disclaimer, the term of this patent is extended or adjusted under 35 U.S.C. 154(b) by 152 days.

(21) Appl. No.: 13/820,744

(22) PCT Filed: Sep. 8, 2011

(86) PCT No.: PCT/US2011/050853
§ 371 (c)(1),
(2), (4) Date: May 17, 2013

(87) PCT Pub. No.: WO2012/033930
PCT Pub. Date: Mar. 15, 2012

(65) Prior Publication Data
US 2013/0298475 A1    Nov. 14, 2013

Related U.S. Application Data

(60) Provisional application No. 61/381,030, filed on Sep. 8, 2010.

(51) Int. Cl.
*B24D 3/02* (2006.01)
*B24D 3/06* (2006.01)
(Continued)

(52) U.S. Cl.
CPC . *B24D 3/06* (2013.01); *B01J 3/062* (2013.01); *B01J 2203/066* (2013.01); *B23B 2222/14* (2013.01); *B23B 2222/41* (2013.01); *B23B 2226/125* (2013.01); *C04B 35/645* (2013.01); *C04B 35/5831* (2013.01); *C04B 2235/3817* (2013.01); *C04B 2235/3843* (2013.01);
(Continued)

(58) Field of Classification Search
CPC .......................................................... C09K 3/14
See application file for complete search history.

(56) References Cited

U.S. PATENT DOCUMENTS 5,011,514 A * 4/1991 Cho et al. .................. 51/295
2003/0054940 A1 * 3/2003 Abe et al. ................. 501/96.4
(Continued)

FOREIGN PATENT DOCUMENTS

EP    0 520 403 A2    12/1992
JP    61141672 A *    6/1986
(Continued)

OTHER PUBLICATIONS

International Search Report for PCT/US2011/050853 dated Apr. 12, 2012.

*Primary Examiner* — Kaj K Olsen
*Assistant Examiner* — Alexandra Moore
(74) *Attorney, Agent, or Firm* — Bryan Cave LLP

(57) ABSTRACT

The present disclosure relates to cubic boron nitride (cBN) cutting elements that have high cBN content and that are cuttable by electric discharge machining (EDM). A cutting element according to an embodiment includes a self-sintered polycrystalline cubic boron nitride (PCBN) compact, having a first phase of cubic boron nitride (cBN) particles and a ceramic binder phase with titanium compounds. The first phase occupies greater than 80% by volume of the self-sintered PCBN compact. The self-sintered PCBN compact has an electrical conductivity sufficient to be cuttable by electrical discharge machining.

9 Claims, 4 Drawing Sheets

(51) Int. Cl.
  B01J 3/06     (2006.01)
  C04B 35/645   (2006.01)
  C04B 35/5831  (2006.01)
  B23H 7/02     (2006.01)
  C04B 35/63    (2006.01)

(52) U.S. Cl.
  CPC . *C04B2235/3847* (2013.01); *C04B 2235/3865* (2013.01); *C04B 2235/3886* (2013.01); *C04B 2235/5436* (2013.01); *C04B 2235/5445* (2013.01); *C04B 2235/5463* (2013.01); B23H 7/02 (2013.01); C04B 35/6303 (2013.01); *C04B 2235/3217* (2013.01); *C04B 2235/3813* (2013.01); *C04B 2235/3856* (2013.01); *C04B 2235/723* (2013.01); *C04B 2235/80* (2013.01); *C04B 2235/95* (2013.01)

(56) References Cited

U.S. PATENT DOCUMENTS

2003/0150442 A1*  8/2003  Boland et al. .................. 125/12
2007/0227297 A1   10/2007 Noda et al.

FOREIGN PATENT DOCUMENTS

WO  2005056495 A1  6/2005
WO  2008093577 A1  8/2008

* cited by examiner

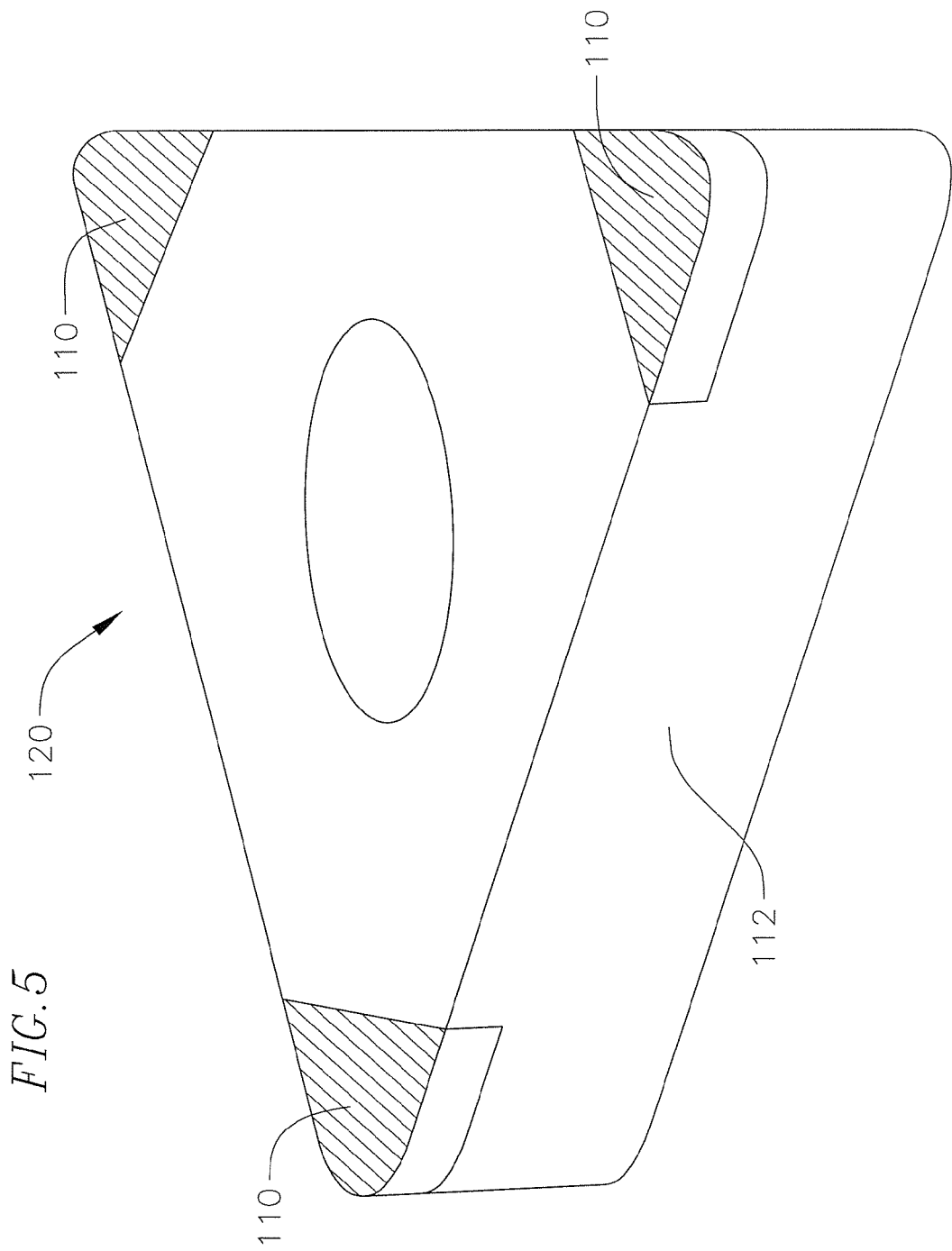

EDM CUTTABLE, HIGH CBN CONTENT SOLID PCBN COMPACT

FIELD OF THE INVENTION

The present disclosure relates to cubic boron nitride (cBN) cutting elements that have high cBN content and that are cuttable by electric discharge machining (EDM).

BACKGROUND

Sintered compacts made from cubic boron nitride (cBN) are used in cutting tools and are known for their good wear resistance. To form such a compact, the cBN particles are sintered at high pressure and high temperature (HPHT sintering) to produce a polycrystalline cubic boron nitride (PCBN) structure. The cBN particles may be HPHT sintered in the presence of a substrate material, which provides a metal catalyst that infiltrates into the cBN layer from the substrate and assists with the formation of PCBN and the intercrystalline bonding between the cBN grains.

Alternatively, the cBN particles may be HPHT sintered without a substrate present, in which case the resulting PCBN compact may be described as "solid" or "self-sintering" or "self-sintered" or "free-standing." A catalyst/binder material may be mixed with the cBN particles prior to sintering in order to promote the formation of the PCBN structure during HPHT sintering, or the catalyst/binder material may be placed adjacent the cBN particles. Sintering without a substrate can be advantageous, as the substrate does not occupy valuable working space within the high pressure press, and the space can be fully occupied by the cBN mixture. As an example, a high pressure press may have a working volume of about 50 $cm^3$. Also, the catalyst/binder material may be uniformly mixed throughout the cBN mixture, rather than infiltrating into the cBN layer from a substrate, and as a result the self-sintered PCBN compacts may have more uniform compositions and material properties.

However, the known catalyst/binder materials used for self-sintering create PCBN compacts that are ceramic (dielectric) in nature and not conductive. As a result the self-sintered PCBN compact cannot be cut by electric discharge machining (EDM). After sintering, it is often necessary to cut the sintered PCBN compact into a desired shape for a particular cutting tool. Cutting by EDM is advantageous in many applications, as EDM cutting can reduce tool processing costs and allow for more precise geometries to be produced. The laser cutting process may produce a less uniform surface finish and less flat (i.e., planar) or perpendicular cut surfaces, resulting in additional finishing costs. The laser cutting process can also cause thermal damage. However EDM cutting requires that the material being cut is conductive or semi-conductive.

The binder materials used to form self-sintered PCBN compacts have typically not been conductive, and therefore the resulting PCBN compact cannot be cut by EDM. For example, one binder precursor material that has been used to form self-sintering PCBN is Aluminum. After HPHT sintering the resulting self-sintering PCBN compact has an Aluminum ceramic binder phase between the PCBN grains. This Aluminum ceramic binder phase is non-conductive. PCBN compacts with other types of binder phases have been attempted in the past, but such compacts have been typically limited to low cBN content, are not EDM-cuttable, and/or do not have sufficient hardness and strength properties for the intended applications.

Accordingly there is still a need for a high cBN content self-sintering PCBN compact with a conductive or semi-conductive ceramic binder phase, that is EDM-cuttable, with desired material properties for an intended application.

SUMMARY

The present disclosure relates to cubic boron nitride (cBN) cutting elements that have high cBN content, are self-sintering, and are cuttable by electric discharge machining (EDM). In one embodiment, a cutting element comprises a self-sintered polycrystalline cubic boron nitride (PCBN) compact, which comprises a first phase of cubic boron nitride particles and a ceramic binder phase comprising titanium compounds. The first phase occupies greater than 80% by volume of the self-sintered PCBN compact. The self-sintered PCBN compact has an electrical conductivity sufficient to be cuttable by electrical discharge machining.

A cutting element according to an embodiment includes a self-sintered polycrystalline cubic boron nitride (PCBN) compact, having a first phase of cubic boron nitride (cBN) particles and a ceramic binder phase with titanium compounds. The first phase occupies greater than 80% by volume of the self-sintered PCBN compact. The self-sintered PCBN compact has an electrical conductivity sufficient to be cuttable by electrical discharge machining.

In another embodiment, a method of forming a self-sintered polycrystalline cubic boron nitride (PCBN) cutting element is provided. The method includes mixing a plurality of cBN particles with a binder precursor to form a mixture. The mixture includes over 80% by volume cBN particles. The method also includes HPHT sintering the mixture without substrate support, to form a self-sintered PCBN compact, and cutting the self-sintered PCBN compact by electrical discharge machining.

BRIEF DESCRIPTION OF THE DRAWINGS

FIG. 5 is a representation of a cutting tool insert tipped with pieces cut from a PCBN compact, according to an embodiment of the present disclosure.

DETAILED DESCRIPTION

The present disclosure relates to self-sintering PCBN compacts that have high cBN content and that are cuttable by electric discharge machining (EDM). In one embodiment, a self-sintering PCBN compact includes high cBN content and a semi-conductive or conductive binder phase that provides good material properties for the sintered PCBN compact and also enables the compact to be cut by EDM. The sintered PCBN compact has sufficient electrical conductivity that it can be cut by EDM into a cutting insert shape (such as cut by EDM into a cutting insert having a particular thickness or a desired surface geometry).

Figure 1:
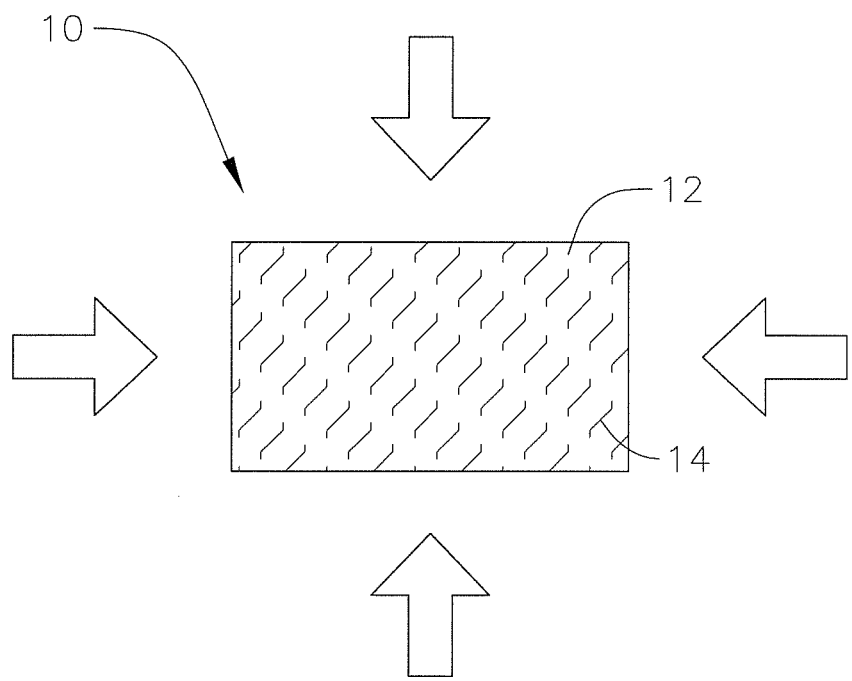
FIG. 1 is a representation of a mixture of cBN particles and a binder precursor for HPHT sintering, according to an embodiment of the present disclosure.
Figure 2:
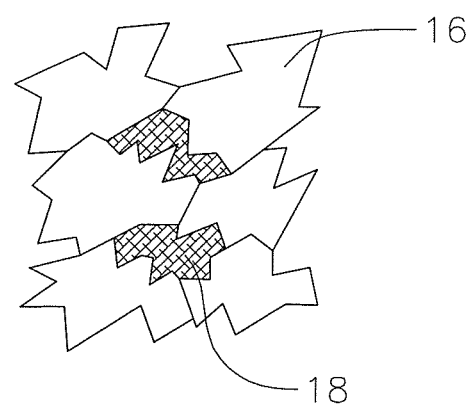
FIG. 2 is a representation of a sintered polycrystalline structure according to an embodiment of the present disclosure.

An embodiment of the present disclosure is illustrated in FIGS. 1-2. FIG. 1 shows a powder mixture 10 including a cBN mixture 12 made up of cBN particles of a desired size or range of sizes. The cBN mixture 12 also includes a binder precursor 14 that is uniformly mixed with the cBN particles. The binder precursor 14 includes the catalyst/binder material that facilitates the formation of PCBN during HPHT sintering. As illustrated in FIG. 1, the cBN and precursor mixture 10 is placed into a high pressure press, and is sintered at high temperature and high pressure. For example, in one embodiment the powder mixture 10 is pressed at a pressure in the range of 3 to 6.5 GPa at an elevated temperature in the range of 1300-1500° C.

This HPHT sintering process creates a polycrystalline structure having a network of intercrystalline bonded cBN grains 16, with the precursor material forming a binder phase 18 remaining in the voids or gaps between the bonded PCBN grains 16, as shown for example in FIG. 2. After HPHT sintering, the sintered PCBN compact may be cut into a desired shape for a particular cutting tool, such as by EDM cutting.

The EDM cutting process relies on some portion of the PCBN compact being conductive or semi-conductive. EDM may also be referred to as wire EDM, spark machining, spark eroding, or wire erosion. EDM cutting works by removing material by electrical discharges, or sparks. With high voltage applied, a series of electrical current discharges are passed between an electrode and the object being cut, causing a small amount of material to be removed. This process works with materials that are electrically conductive or at least semi-conductive.

In one embodiment, a self-sintering PCBN compact is provided that has high cBN content and a binder phase 18 that is conductive or semi-conductive. The PCBN compact is formed by HPHT sintering a mixture of cBN powder 12 and a binder precursor 14. The powder mixture includes high cBN content, such as about 80% cBN by volume, or above 80% cBN by volume, or about 81% by volume, or above 81% by volume, or about 85% by volume, or above 85% by volume, or between 80-95% by volume, or between 85-95% by volume. In one embodiment the powder mixture includes about 85% by volume cBN. In one embodiment the cBN particles have a size in the range of about 12-22 microns, which is useful for forming PCBN compacts for use as blanks for friction stir welding and high material removal rates in metal cutting. In another embodiment the cBN particles have a size in the range of about 1-2 microns, which is useful for forming PCBN compacts for use in machining metal with fine surface finishing. In another embodiment, the cBN particles are in the range of 2-4 microns in size, and in another embodiment they are sub-micron (i.e., in the range of 0-1 micron) in size. In another embodiment, the cBN particles are in the range of 3-6 microns in size, and in another embodiment 6-12 microns. Other cBN particle sizes and ranges of sizes can be used depending on the application. The cBN particle size ranges given herein are in accordance with the ANSI B74 20 standard. For example, a range of 2-4 microns means that D5 (5% of the particles) have a minimum particle size of 2 microns and D95 (95% of the particles) have a maximum particle size of 4 microns. As such, less than 5% of the particles are less than 2 microns in size, and less than 5% of the particles are greater than 4 microns in size.

The binder precursor 14 occupies the remaining volume percent of the powder mixture, such as less than 20% by volume, or less than 15% by volume, depending on the amount of cBN. The binder precursor 14 is selected such that the resulting binder phase 18 is conductive or semi-conductive. In one embodiment, the binder precursor includes Titanium (Ti). In particular, in one embodiment the binder precursor is titanium aluminum carbide ($Ti_3AlC$). In one embodiment, the binder compound is ground to sub-micron sized powder particles (i.e., particles having average particle size of less than 1 micron) and is then blended with the cBN particles. In one embodiment, the oxygen level in the binder precursor is kept low, such as less than 5% by weight (of the binder weight). The low oxygen content promotes better binding between the materials during HPHT sintering.

In one embodiment the cBN and binder precursor mixture includes 85% by volume 2-4 micron cBN particles and 15% by volume sub-micron sized particles of $Ti_3AlC$. Other options for the binder precursor 14 include $Ti_2AlC$ and $Ti_{2-3}AlN$. In one embodiment the binder precursor comprises one or more of the following: $Ti_3AlC$, or $Ti_3AlN$, or $Ti_2AlC$, or $Ti_zAlN$ (where z=2 or 3). $Ti_3AlN$ may not be detectable, although present in trace amounts (typically below 1% by volume). The binder precursor may be synthesized by a reaction of Ti, TiC, TiCN, and TiN with Aluminum. In other embodiments, the cBN and binder precursor mixture may also include 0-6% by volume Cobalt and/or 0-2% by volume WC. Cobalt may be added to further improve the cBN particle rearrangement and densification during sintering, and to increase the conductivity of the PCBN compact. The tungsten carbide (WC) may be added to increase the toughness of the PCBN compact. However the addition of these materials is optional.

The mixture of cBN particles and the binder precursor particles is then HPHT sintered without substrate support, to form a self-sintered PCBN compact with a first phase of PCBN and a second binder phase between the PCBN grains (see FIG. 2). The self-sintered PCBN compact has high cBN content, such as above 80% cBN by volume, or above 81% by volume, or above 85% by volume, or between 80-95% by volume, or between 85-95% by volume. In one embodiment the self-sintered PCBN compact includes about 85% by volume cBN, in the form of the first PCBN phase.

During HPHT sintering, the titanium-aluminum-carbide precursor reacts with the cBN and with oxygen within the powder mixture, and forms various compounds that form the binder phase 18. In one embodiment, the components of the precursor react to form titanium carbide (TiC), titanium carbonitride ($TiC_xN_y$), titanium nitride (TiN), titanium diboride ($TiB_2$), aluminum nitride (AlN), and/or aluminum oxide ($Al_2O_3$). These compounds are formed during sintering, rather than provided directly as the binder precursor material. The HPHT sintering may be referred to as reaction sintering, as the binder precursor breaks down and reacts with the cBN particles during HPHT sintering to form the binder phase compounds. These compounds in the sintered binder phase 18 (see FIG. 2) are formed by reaction during the HPHT sintering rather than being provided in the precursor mixture. Reaction sintering can promote better hardness in the sintered material. For example, a sintered compact formed with a binder precursor of TiCN and Al showed a hardness of about 3,000 kg/mm$^2$ (with 85% by volume cBN). A sintered compact formed with a binder precursor of $Ti_3AlC$ according to an embodiment herein showed a hardness of greater than 3,200 kg/mm$^2$ (85% by volume cBN).

In one embodiment, the binder precursor fully reacts with the cBN during HPHT sintering, such that the precursor compound is no longer present after HPHT sintering. The components of the precursor compound fully react with the cBN particles to form other binder phase compounds, such as those listed above. The sintered PCBN compact may be analyzed by x-ray diffraction, scanning electron microscope (SEM), or other known methods to identify the compounds that are present. In one embodiment, the pre-sintering binder precursor compound (such as $Ti_3AlC$) is no longer present in the sintered PCBN compact, or is present in only trace amounts (typically less than 1% by volume).

The resulting binder phase 18 includes Titanium in the form of the reacted, sintered compounds (titanium carbide, titanium carbonitride, titanium nitride, titanium diboride). It is believed that when Aluminum is provided in the binder precursor (such as $Ti_3AlC$), the Aluminum readily reacts with oxygen in the powder mixture, forming $Al_2O_3$, and thereby causing the Titanium to react with the cBN particles, forming TiN and $TiB_2$. In one embodiment the binder phase is predominantly titanium nitride and titanium carbide. Titanium compounds are semi-conductive, and thus the binder phase is electrically conductive. As a result, the self-sintered PCBN compact with this binder phase 18 is EDM-cuttable to form a desired cutting insert shape. The conductivity of the PCBN compact can be measured by its electrical resistance. In one embodiment, the PCBN compact that is formed after HPHT sintering the cBN particles with the titanium-aluminum-carbide binder precursor has an electrical resistivity of approximately $0.5 \times 10^{-2}$ ohm-m ($\Omega$-m). In one embodiment, a self-sintered PCBN compact includes an electrical resistivity p of less than about $0.5 \times 10^{-2}$ ohm-m ($\Omega$-m). In one embodiment, a self-sintered PCBN compact includes an electrical resistance of less than about $10^{-2}$ ohm-m ($\Omega$-m). This low resistivity enables the PCBN compact to be cut by EDM. Electrical resistivity can be measured from an EDM-cut bar using a four-point method.

In one embodiment, the sintered binder phase 18 is devoid of elemental Titanium, or includes elemental Titanium only in trace amounts. The Titanium from the binder precursor fully reacts with the cBN particles to form titanium boride, titanium carbide, and titanium nitride in the binder phase. These titanium compounds are stable and have good hardness for cutting tools. Additionally, they are semi-conductive. This binder phase gives the self-sintered PCBN compact good material properties for cutting tool applications, while also enabling the PCBN compact to be EDM-cuttable. In one embodiment the self-sintered PCBN compact has a Vickers hardness of greater than 3,200 kg/mm². In one embodiment, the self-sintered PCBN compact has a 3-point average bending strength of 1080 MPa (tested with a span of 8.3 mm, a width of 1.2 mm, and a thickness of 1.0 mm).

In one embodiment, the binder precursor 14 reacts with the cBN to form a binder phase 18 that is ceramic in nature, rather than metallic, thereby providing more thermal stability in the self-sintered PCBN compact, while also providing electrical conductivity. In some applications, a metallic binder phase is less thermally stable than a ceramic binder phase. A metallic binder phase can expand at high temperature, causing cracking in the PCBN layer. The metals are also more likely to be reactive with the workpiece material that is being machined by the PCBN cutting insert. Also, PCBN compacts with metallic binder phases typically rely on a substrate during HPHT sintering to provide the metal infiltrant, and thus these compacts are not self-sintering. The Titanium-based binder phase 18 of embodiments here is conductive but is still ceramic in nature, providing chemical and thermal stability.

The Titanium constituents also provide electrical conductivity, so that the binder phase of the self-sintered PCBN compact is within the conductive range required by EDM cutting, for example, having an electrical resistivity below about $10^{-2}$ ohm-m ($\Omega$-m). The titanium aluminum carbide precursor ($Ti_3AlC$) is believed to provide good conductivity because the molar ratio of Titanium to Aluminum is 3. Therefore, there will be more free Ti than Al released and then reacted with the cBN powder to form $TiB_2$ and TiN compounds. The Ti compounds are semi-conductive, while the Al compounds are not conductive. Thus in embodiments herein, the binder phase 18 includes more Ti compounds than Al compounds, in order to make the sintered PCBN cuttable by EDM. The binder phase is predominantly titanium nitride and titanium carbide, which form a conductive network through the PCBN structure, providing the PCBN compact with sufficient electrical conductivity for EDM cutting. In one embodiment, the ratio of Ti to Al in the self-sintered PCBN compact is 3, and in another embodiment it is 2.

Figure 3:
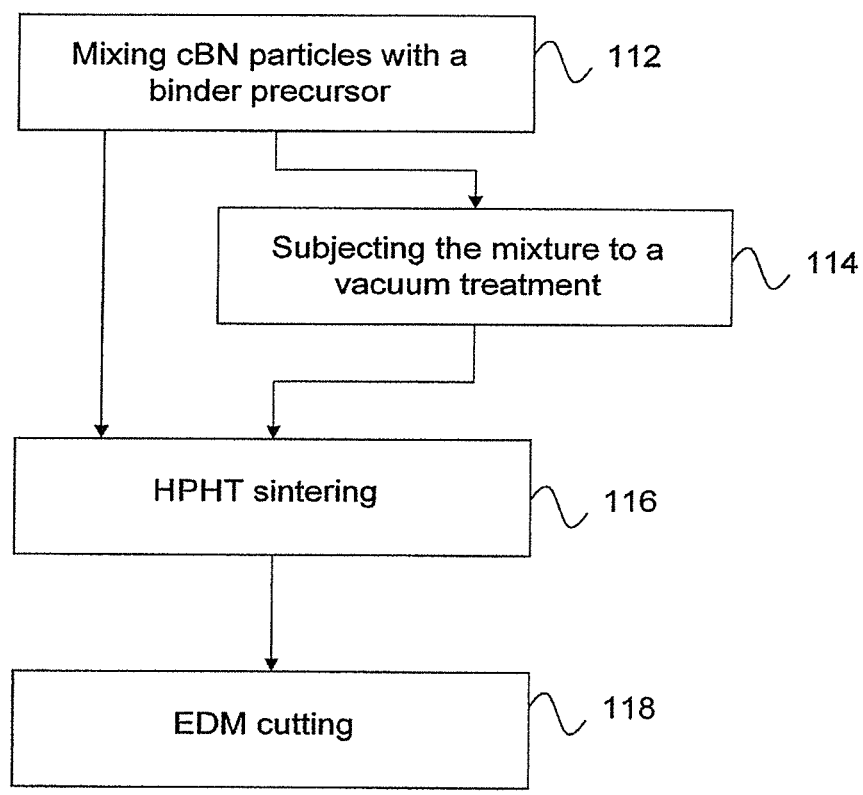
FIG. 3 is a flowchart of a method of forming a self-sintered EDM-cuttable PCBN compact according to an embodiment of the present disclosure.

In one embodiment, a method of forming a self-sintering EDM-cuttable PCBN compact is provided, as shown in FIG. 3. The method includes mixing cBN particles with a binder precursor to form a uniform cBN and precursor mixture (112). The cBN particles occupy at least 80%, such as about 85%, of the mixture by volume. The cBN particles and the binder precursor are provided in powder form and are mixed together by a suitable mixing procedure such as ball mixing, or attritor milling. Optionally, the method includes subjecting the cBN and precursor mixture to a vacuum treatment (114). In one embodiment this step includes placing the powder mixture into a vacuum furnace, applying a vacuum, and heating the furnace. In one embodiment the furnace is heated to about 1,000° C. for about one hour. The vacuum promotes initial reaction between the binder precursor and the cBN particles, thereby making the powder mixture more stable for operation. The binder precursor compound may partially decompose or break down, and the free atoms can begin to react with the cBN particles. This step may be described as a pre-sintering reaction.

After subjecting the mixture to a vacuum, or after mixing the cBN and precursor particles together if the vacuum step is omitted, the method then includes HPHT sintering the free-standing cBN and precursor mixture, without a substrate, to form a self-sintered PCBN compact (116). The HPHT sintering creates PCBN compact with a binder phase of compounds that formed from reactions between the binder precursor and the cBN. The method then includes cutting the PCBN compact into a suitable cutting insert by an EDM cutting method (118).

As an example, the EDM cutting step may include cutting the self-sintered PCBN compact into one or more slices that have a thickness of about 4.8 mm, or about 3.2 mm, or about 1 mm, or in the range of 1 mm to 50 mm, or other thicknesses, depending on the application. These sliced wafers can then be brazed onto a carbide body to form a cutting insert. The cutting insert may be used in applications where high wear resistance is desired, such as machining cast iron (or grey iron) and super alloys (such as nickel-based super alloys). EDM cutting can be used to create a uniform and perpendicular peripheral cut on the PCBN insert.

Figure 4:
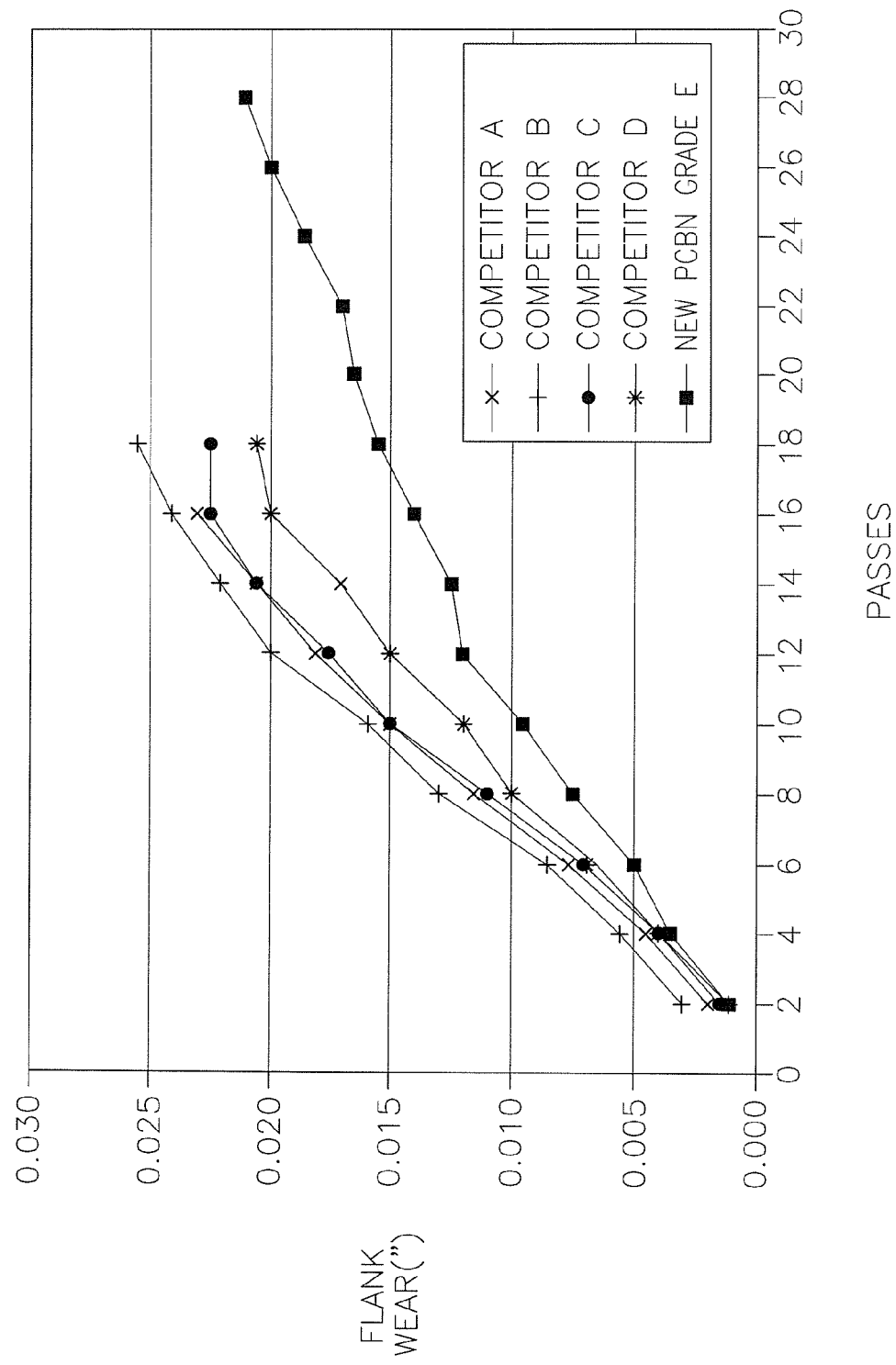
FIG. 4 is a chart showing test results for several PCBN compacts including a compact according to an embodiment of the present disclosure.

FIG. 4 shows a plot of testing results according to one embodiment of the present disclosure. Several PCBN cutting elements were compared by subjecting them to a cast iron turning test. The testing machine was a Mori Seiki SL-25 CNC lathe, and the workpiece material was Class 35 grey cast iron, with 200 Brinell hardness (BHN). The turning speed was 3,500 surface feet per minute (sfpm), and the feed rate was 0.020 inches per revolution. The depth of cut was 0.015 inches. The work piece wall thickness was 1.32 inches. The test was performed in dry conditions.

The PCBN compacts that were subjected to the test are summarized in Table I below. The bending strength of each PCBN compact is also provided for comparison.

TABLE I

| PCBN Compact | Description | Bending Strength (MPa) |
|---|---|---|
| Comparative A | Carbide-backed PCBN compact with metallic binder phase | (not available) |
| Comparative B | Carbide-backed PCBN compact with metallic binder phase | (not available) |
| Comparative C | Carbide-backed PCBN compact with cermet binder phase | 725 MPa |
| Comparative D | Carbide-backed PCBN compact with cermet binder phase | 1,100 MPa |
| New PCBN Grade E | Self-sintered PCBN compact with 85% by volume cBN, according to an embodiment of the present disclosure | 1,080 MPa |

The PCBN grade E insert was brazed with a self-sintered PCBN compact formed by HPHT sintering 85% by volume 2-4 micron cBN particles and 15% by volume $Ti_3AlC$ particles. The grade E is a self-sintered high content PCBN compact that is EDM-cuttable.

The number of passes versus the wear on each cutting element is plotted in FIG. 4. As shown in FIG. 4, the grade E out-performed the other cutting elements in the test, enduring the largest number of passes with the least amount of wear.

FIG. 5 shows a cutting tool insert 120 tipped with pieces 110 cut from a PCBN compact, according to an embodiment of the present disclosure. The cutting insert 120 includes a cemented carbide insert body 112, and the PCBN tip pieces 110 cut from the PCBN compact are brazed to the body 112 at the corners of the body.

Relative sizes are exaggerated in the figures for clarity, and are not necessarily to scale.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A method of forming a self-sintered polycrystalline cubic boron nitride (PCBN) cutting element comprising:
   mixing a plurality of cBN particles with a binder precursor to form a mixture, the mixture comprising over 80% by volume cBN particles;
   HPHT sintering the mixture without substrate support, to form a self-sintered PCBN compact; and
   cutting the self-sintered PCBN compact by electrical discharge machining; in which the binder precursor comprises one or more of the following: $Ti_3AlC$, $Ti_2AlC$, $Ti_3AlN$.

2. The method according to claim 1, further comprising heating the mixture under vacuum prior to HPHT sintering.

3. The method according to claim 1, further comprising partially reacting the binder precursor with the cBN particles prior to HPHT sintering.

4. The method according to claim 1, wherein the HPHT sintering comprises reaction sintering to form a binder phase in the self-sintered PCBN compact.

5. The method according to claim 1, wherein the mixture comprises over 85% by volume cBN particles.

6. The method according to claim 1, including mixing the cBN particles and the binder by means of attritor milling.

7. The method according to claim 1, wherein the binder precursor is $Ti_3AlC$.

8. The method according to claim 1, wherein the binder precursor has a mean grain size of less than 1 micron.

9. The method according to claim 1, wherein the binder precursor contains less than 5% by weight of oxygen based on the binder weight.

* * * * *